(No Model.)

E. A. RAY.
ANIMAL TRAP.

No. 442,737. Patented Dec. 16, 1890.

Attest:
F. H. Schott
M. A. Reinohl

Inventor
E. A. Ray
By his attorneys
Johnston, Reinohl & Dyer

UNITED STATES PATENT OFFICE.

ETHEL A. RAY, OF FLORENCE, SOUTH CAROLINA.

ANIMAL-TRAP.

SPECIFICATION forming part of Letters Patent No. 442,737, dated December 16, 1890.

Application filed August 30, 1890. Serial No. 363,518. (No model.)

*To all whom it may concern:*

Be it known that I, ETHEL A. RAY, a citizen of the United States, residing at Florence, in the county of Florence and State of South Carolina, have invented certain new and useful Improvements in Animal-Traps; and I do hereby declare the following to be a full, clear, and exact description of the invention, such as will enable others skilled in the art to which it appertains to make and use the same.

My present invention relates to traps, and has especial reference to that class of traps which are used for trapping otter and like animals.

On trapping for the otter and animals of its species the trap must be concealed, and for this purpose it is frequently put below the surface of the water in a stream; or, if placed on the bank of the stream, it is covered with leaves, grass, or twigs, or a thin coat of mud spread over it to completely conceal the trap. Ice also often forms on the trap. In the ordinary construction of jaw-traps the matter used to conceal the trap is frequently caught between the shanks of the jaws and prevents the bowed portion of the jaws impinging upon each other, and as a consequence the animal caught pulls his feet out of the trap and escapes. Furthermore, should the jaws close, the serrated edges cut off the legs or feet, and where the plain-surfaced jaws are used the animal succeeds in severing the legs or feet by repeatedly bending them back and forth over the sharp upper edges of the bowed portion of the jaws. My invention has for its object a construction of traps to remedy these defects, and will be hereinafter described, and particularly pointed out in the claims.

Figure 1:
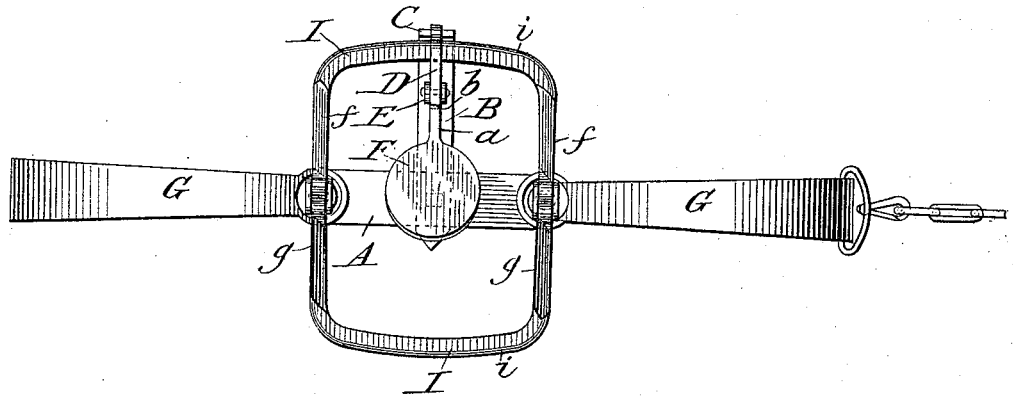
Figure 2:
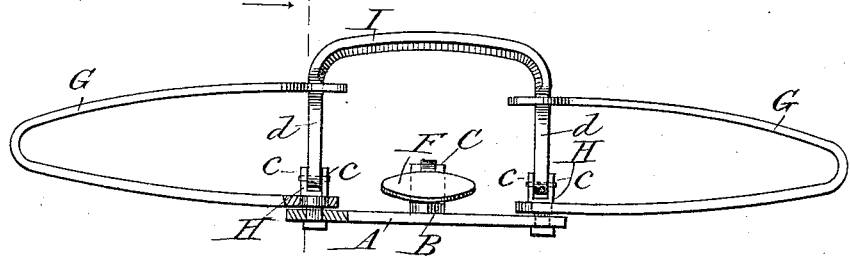
Figure 3:
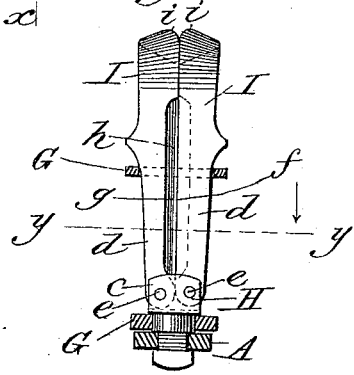
Figure 4:
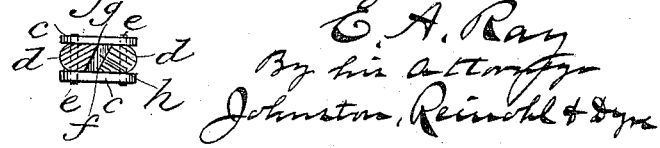

In the accompanying drawings, which form part of this specification, Figure 1 represents a plan of my improved trap set; Fig. 2, a side elevation of the trap closed; Fig. 3, a section on line $x\ x$ of Fig. 2; and Fig. 4, a section on line $y\ y$ of Fig. 3.

Reference being had to the drawings and the letters thereon, A indicates a bar, from one side of which projects an arm B, having an upturned outer end C, to which the latch D is secured, and a post E, which supports the bait-pan F, which is provided with an extension $a$, having a notch $b$, with which the latch D engages to set the trap. G G are bow-springs of ordinary construction. Through the bar A are inserted posts H H, with which the springs engage and are held in position, and in the upper end of the posts is a recess, bounded on its sides by flanges $c\ c$, between and to which the shanks $d\ d$ of the jaws I I are secured by pins $e\ e$ passing through the ends of the shanks of the jaws and the flanges. The shanks are set in the recess in the post so that their rounded ends bear upon each other to afford bearing-surfaces for each other when the jaws are forcibly separated, as by an axe or similar implement, and prevent breaking of the pins $e\ e$. The forcible separation of the jaws in the manner referred to becomes necessary when the trapper is in water setting the trap, and the trap is accidentally sprung while he is working with it and his fingers of one hand are caught between the jaws, as frequently occurs with the most skillful trapper.

The shanks of the jaws are beveled in opposite directions to form cutting-edges $f\ g$ and afford a recess or space $h\ h$. The cutting-edges sever twigs, stems of leaves, and like matter that may be caught between the jaws when they are sprung, and the recesses afford space for dry mud, ice formed on the shanks, or débris which may collect on the trap when set.

The outer edges $i\ i$ of the bowed portion of the jaws are rounded to prevent the animal caught between the jaws severing his legs, feet, or toes, as is frequently done in traps having serrated impinging surfaces or sharp upper edges on flat smooth impinging surfaces.

By the construction shown the most radical defects in jaw-traps used for trapping animals of the species named (and by which fully one-half caught in the trap escape before the trapper can secure them) are overcome and an effective and reliable trap produced.

Having thus fully described my invention, what I claim is—

1. An animal-trap having bowed jaws provided with broad impinging surfaces, and the shanks of the jaws beveled in opposite directions on their adjacent faces to form cutting-edges, and space for débris, substantially as described.

2. An animal-trap having bowed jaws provided with broad impinging surfaces and rounded upper edges, and shanks beveled in opposite directions on their adjacent faces between the impinging surfaces and the ends of the shanks to form cutting-edges, and space for débris, substantially as described.

3. An animal-trap having jaws provided with broad impinging surfaces, and cutting-edges on the shanks of the jaws between the impinging surfaces and the ends of the shanks, in combination with posts having side flanges, between which the jaws rest, said jaws being pivotally secured therein to bear upon each other at their ends to form fulcra and relieve the pins of strain in forcibly opening the trap, substantially as described.

In testimony whereof I affix my signature in presence of two witnesses.

ETHEL A. RAY.

Witnesses:
D. C. REINOHL,
W. P. JOHNSTON.